United States Patent [19]

Bantz

[11] Patent Number: 4,554,724

[45] Date of Patent: Nov. 26, 1985

[54] METHOD FOR INSTALLING AN AUTOMATIC GUIDED VEHICLE SYSTEM GUIDE PATH

[75] Inventor: Wesley R. Bantz, Peoria, Ill.

[73] Assignee: AGVS Installations, Inc., Peoria, Ill.

[21] Appl. No.: 636,330

[22] Filed: Jul. 31, 1984

[51] Int. Cl.⁴ .............................................. B23P 11/02
[52] U.S. Cl. ....................................... 29/451; 29/460;
52/221; 52/741; 156/293; 174/98; 174/48;
405/157
[58] Field of Search ................... 29/428, 460, 450, 451;
74/49; 52/741, 743, 220, 221, 287, 290;
405/154, 157, 179, 174; 404/47

[56] References Cited

U.S. PATENT DOCUMENTS

| | | | |
|---|---|---|---|
| 2,773,512 | 12/1956 | Burk | 405/154 |
| 3,335,647 | 8/1967 | Thorp, Jr. | 404/47 X |
| 3,473,339 | 10/1967 | Schlafly, Jr. | 405/157 |
| 3,713,947 | 1/1973 | Hawkins | 174/98 UX |
| 3,798,743 | 3/1974 | Griswold | 29/428 |
| 3,818,659 | 6/1974 | Anderson | 52/287 X |
| 3,862,479 | 1/1975 | Laderoute | 29/155 R |
| 4,030,259 | 6/1977 | Meckler | 52/741 X |
| 4,250,675 | 2/1981 | Meckler | 52/741 X |
| 4,332,429 | 6/1982 | Frick et al. | 174/48 X |
| 4,341,007 | 7/1982 | Kruszona | 29/451 |

*Primary Examiner*—Charlie T. Moon
*Attorney, Agent, or Firm*—Hill, Van Santen, Steadman & Simpson

[57] ABSTRACT

A method for installing an automatic guided vehicle system guide path in the form of an inductive loop disposed beneath the floor of a factory or other facilities includes the steps of establishing a desired floor layout to meet the needs of the facility wherein the system is to be installed, cutting a trough or slot in the floor following the layout with a saw, placing the signal wires into the slot, installing a mechanical seal in the floor slot flush with the floor surface, setting the mechanical seal to a final depth, and applying a primer and final seal over the slots including the mechanical seal. The signal wires are thus retained "free floating" within the slot rather than being solidly embedded in the floor, and are relatively easily accessible by removing the mechanical seal and final seal for access for repair and maintenance.

8 Claims, 3 Drawing Figures

U.S. Patent  Nov. 26, 1985  4,554,724
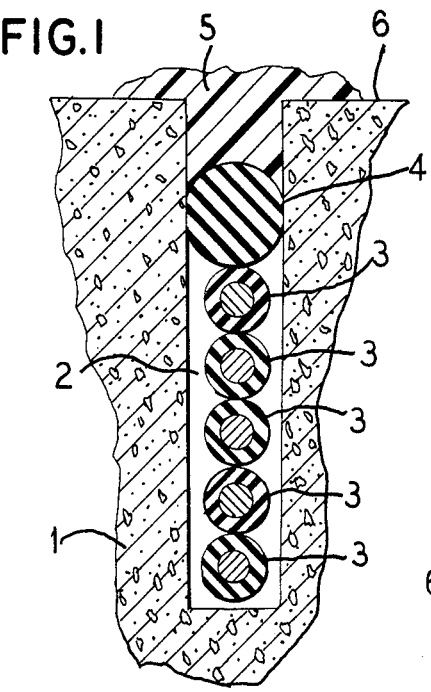
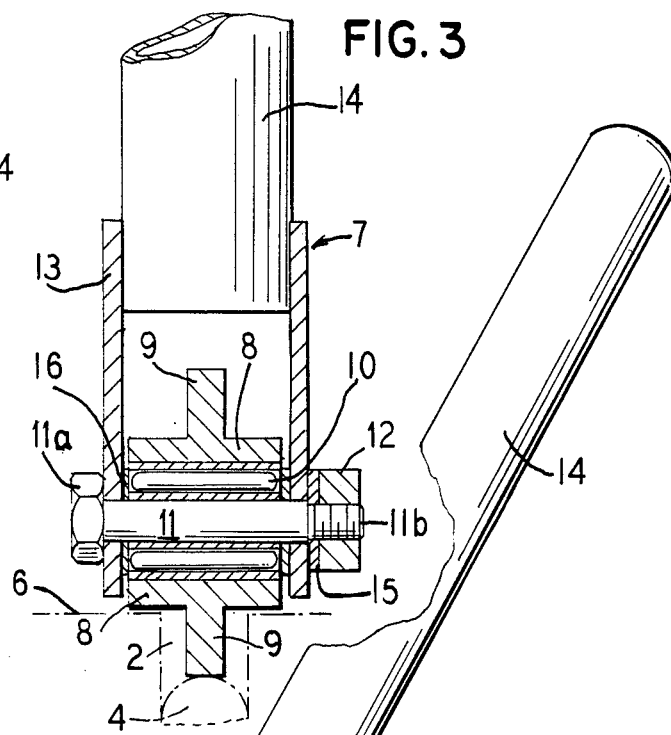
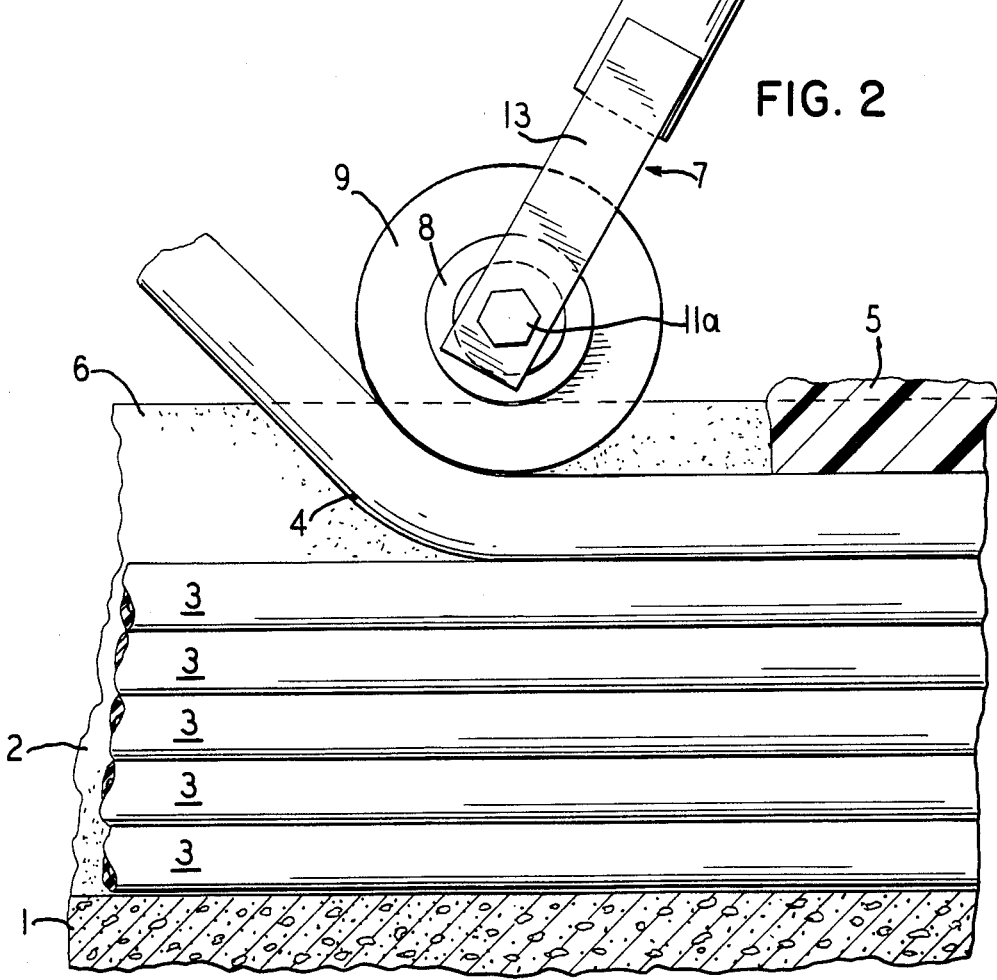

METHOD FOR INSTALLING AN AUTOMATIC GUIDED VEHICLE SYSTEM GUIDE PATH

BACKGROUND OF THE INVENTION

1. Field of the Invention

The present invention relates to methods for installing an automatic guided vehicle system guide path, and in particular to a method for installing such a system having an inductive loop disposed below floor or ground level.

2. Description of Prior Art

Automatic vehicle guidance systems, so-called "driver less" systems are known which utilize an inductive loop embedded in the floor of the facility in which the system is to be used. The loop may in some instances be taped to the floor of the facility. The inductive loop provides a predetermined route which vehicles will follow as they travel throughout the facility to perform a variety of functions. The guide paths must be accurately located relative to the floor plans and may include information points, intersections, bypasses, station stops and other features which may be integrated in the system design. Conventional guidance networks generally includes signal wiring connected to pilot line drivers which, when energized, may generate up to five different frequencies which serve as signals which are detected by sensors disposed on the vehicles. Simpler systems may be utilized having only one signal frequency.

The layout for such vehicle system guide path may range from simple to very complex depending upon the requirements of the customer. Most systems are in the category of complex systems wherein several load or unload positions, several vehicles, several information points, and integration with other systems are required. The guide path thus also becomes an information network permitting the vehicles and a control computer to communicate with each other via the network sensors and information points. It is essential that all of the system interfaces within the guide path are installed properly to have an effective trouble-free operating system.

The vehicles utilized in such systems vary in size, capacity and functions. The vehicles also vary in the manner of design and placement of the drive and steering wheels of the vehicle, causing a variety of guide path conditions to be encountered. When two different types of vehicles must operate in the same system, it will be necessary to have two guide paths which may overlap and operate at different signal frequencies. These conditions will effect the turning radii of the vehicles, the entering or leaving of a transaction station via vehicle, and locations of the sensors with respect to the guide path. Much of this detail may be included by the engineering group providing the system equipment, however, the installer or installation crew must be knowledgeable with respect to the overall system parameters for incorporating the desired functions into the actual floor plan.

The generally accepted conventional method of installing signal wire or guide wire, by embedding the wire in the floor, is as follows. A floor plan is first laid out according to the designed details for meeting the user's requirements. Floor slots are cut, normally in a concrete floor, to the depth and width specified including curves, turns and bypasses according to the previously made floor layout. The signal wires are placed in the floor slots according to the wiring diagram and are tested for continuity. The floor slots are back filled with one of several commercially available concrete grouting compounds which are poured or troweled or gunned into the slots. The material when applied is usually wet and is forced into the slots by some means so as to completely surround the wires in the slots. The grouting material is then troweled so as to be even with the floor surface, and is permitted to cure for a period of three to four hours. Care must be taken to apply the grouting product in a manner which allows for a certain degree of shrinkage during curing, and material must be added or removed as required in order to achieve a finished installation which is flush with the floor surface. The objective is to achieve a smooth surface with no depressions or voids, and no raised or rounded areas, on the guide path or along the return cuts.

This conventional method results in the guide path wires essentially becoming an integral part of the floor, once the grout is fully cured. The top surface is sealed with an accepted concrete sealer. The grout material in conventional installation methods hardens almost as hard as the surrounding concrete. Concrete floors are a subject to expansion, contraction, settling and cracking over a period of time. Moreover, in industrial plants where machinery is in operation, other forces such as vibration, shock loading, heavy load carrying vehicles, and the like will be encountered which add stresses or strains to the guide path areas. These forces and external disruptions make the embedded signal wires subject to breakage or separation which requires repairs to be made and interruption of the system during such repairs. Such repair of conventional installations requires extreme care and hand chiselling in order to gain access to the embedded wires once the trouble area is identified. This is a difficult and time consuming process. The same procedure is necessary if the system is to be expanded or changed in the future.

SUMMARY OF THE INVENTION

It is an object of the present invention to provide a method for installing an automatic guided vehicle system guide path which permits the guide wires to be set within a precisely cut slot at a selected dimension beneath the floor surface throughout the entire system.

It is another object of the present invention to provide such an installation method which includes a means of wire containment in the form of a mechanical seal directly above the signal wire or wires at a fixed depth below the floor surface.

Another object of the present invention is to provide such a method for installation which permits relatively easy access to the signal wire or wires, even after the slot has been sealed, and the system has been in use for sometime. This method includes the following steps. The floor layout is again established to meet the user's requirements. The slot or trough is cut in the floor with a precision saw and the area of the cuts and slots are cleaned with vacuum. The signal wires are placed in the floor slots and tested for continuity. A mechanical seal is installed in the floor slots above the signal wires, initially flush with the floor surface which prevents dirt and other material from reaching the wires. At this point, the customer may, if desired, actually test the vehicles and the system before final sealing. The mechanical seal is then set to its final depth in the slot and functions as a retainer for the signal wires at a specified depth below the floor surface throughout the entire system. A primer is then applied to the floor slots which prepares the concrete surface for maximum adhesion of a thermoplastic material which is subsequently applied. The mechanical seal, installed earlier, prevents the primer and the final seal material from reaching and encapsulating the wires. The wires thus remain "free floating" within the slot, without being rigidly held in place by surrounding material. The thermoplastic material is mixed according to specific ratios and coverage requirements, and applied to the floor slots using suitable applicators. The material when applied is in a liquid state and a slight overfill is applied in order to allow for shrinkage upon final curing. The material is permitted to cure for four or five hours until the top surface has lost all tackiness. A final dressing of the floor slots is then undertaken by smoothing the slots flush with the floor surface by the use of special grinders or a hot iron trowel.

The method of installation disclosed and claimed herein permits the signal wires to flex independently within the slots because the wires are not totally encapsulated by grout or cement. Floor cracking, settling, expansion or contraction can occur with no effect upon the signal wires, and the seal remains intact by virtue of its elasticity by absorbing these forces. Future access to the signal wires for expanding the system or changing functions is much more easily accomplished than in conventional installations because hand chiselling and labor intensive wire exposure for splicing or repairs is not required, as is necessary in grouted or cemented systems. The thermoplastic material utilized in the method disclosed and claimed herein has excellent bonding to the concrete floor and produces a smooth durable surface. The material will flex with the concrete without breaking and will withstand compressive forces without cracking, thereby retaining its original characteristics for many years of service.

DESCRIPTION OF THE DRAWINGS

FIG. 1 is a sectional view of an automatic guided vehicle system guide path installed in accordance with the principles of the method disclosed herein;

FIG. 2 is a side view, partly in section, showing the method for installing an automatic guided vehicle system guide path in accordance with the principles of the present invention; and FIG. 3 is a detailed sectional view of the tool used for installing the mechanical seal to a predetermined depth in accordance with the method disclosed herein.

DESCRIPTION OF THE PREFERRED EMBODIMENTS

A sectional view of an automatic guided vehicle system guide path installed in accordance with the method disclosed and claimed herein is shown in FIG. 1. The system is installed in a floor 1, which may be, for example, concrete. A slot or trough 2 is cut in the floor 1 by means of a saw, and one or more signal wires 3 are laid above each other within the slot 2, and are tested for continuity. The mechanical seal 4 which may be, for example, a generally cylindrical strand of elastic or resilient material, is initially inserted in the slot 2 so as to be substantially flush with a surface 6 of the floor 1. At this point, the entire system may be tested utilizing actual vehicles.

If the system performs satisfactorily under test conditions, the mechanical seal 4 is further inserted within the slot 2 by means of a tool 7 described in greater detail below, in the manner shown in FIG. 2. The tool 7 ensures that the mechanical seal 4 will be inserted at a uniform predetermined depth throughout the entire system. The space above the mechanical seal 4 within the slot 2 is then filled with a thermoplastic material 5, after the application of a suitable primer. The thermoplastic material 5 is shown in FIGS. 1 and 2 as being applied in an amount which is slightly more than necessary to precisely fill the volume of the slot 2 above the mechanical seal 4, in order to allow for shrinkage during curing. After the thermoplastic material 5, applied in liquid form, has cured, the excess is removed by suitable polishing and dressing. A final sealer may then be applied over the entire floor.

The details of the tool utilized to set the mechanical seal 4 to a precisely predetermined depth throughout the entire system are shown in FIG. 3. The tool 7 has a wheel 8 with a centrally disposed flange 9 thereon. The width of the wheel 8 is greater than the width of the slot 2, so that as the tool 7 is pushed along above the slot 2, the wheel 8 rides on the floor surface 6 and the flange 9 forces the mechanical seal 4 into the slot 2 to a depth which is precisely determined by the extent of the flange 9 beyond the surface of the wheel 8. The wheel 8 is held in a wheel mount 13 having an axle 11. The axle 11 extends through bearings 10 in the wheel 8 to permit free rotation of the wheel 8 as the tool 7 is moved along the floor surface 6. The axle 11 may, for example, be a bolt having axial movement restrained at one end by a bolt head 11a and at the opposite end by a nut 12 received on a threaded end 16 of the axle 11. Bushings or washers 15 and 16 may be utilized as needed. The wheel mount 13 is received in a handle 14 which facilitates movement of the tool 7 along the floor surface 6.

The slot 2 may be cut in the floor 1 by a 400 millimeter heavy duty or medium duty self-powered concrete saw utilizing diamond saw blades. A saw suitable for use in the method disclosed and claimed herein is commercially available from AB Sag- & Betongborrning, Tagenvagen 1, 422 47 Hisings Backa, Goteborg, Sweden.

A grinder suitable for bringing the excess thermoplastic material 5 flush with the floor surface 6 after curing is a model 1600 combination grinder/vacuum manufactured by AB B. Kihlstrom, Sallerupsvagen 140B, Box 16116, 20025 Malmo, Sweden. The grinder is distributed by the above-identified AB Sag- & Betongborrning.

A suitable thermoplastic material for use as the thermoplastic material 5 is Lanat 14-920 used with a curing agent Lanat hardener 14. Lanat 14-920 contains no irritating or dangerous constituents, but the curing agent, Lanat hardener 14, consists of MDI (difenylmetandiisocyanate polymers). Contact with the skin should be avoided and any accidentally contaminated skin areas should be cleaned thoroughly with soap and water. All working areas should be well ventilated. A preferred mixture of the two components of the thermoplastic material 5 is 3.5 liters of Lanat 14-920 and one liter of curing agent Lanat hardener 14. The two components should be mixed carefully for about three minutes with 3.5 liters of dry silica sand. The usable potlife of the mixture at 20° C. after mixing the components is about fifteen minutes. After hardening the resulting polyurethane mixture is hard and can be ground. A protective mask should be worn when grinding to avoid inhalation of polyurethane dust.

A suitable primer for use in the installation method disclosed herein is Lanat 16 000. This is a one-component moisture curing polyurethane resin with excellent adhesion on concrete. It is a 50% solution of difenylmetandiisocyanate polymers in xylene and ethylglycolacetate. The Lanat 16 000 should be applied by painting a thin layer two to five hours before the application of the thermoplastic material.

The primer and thermoplastic material described above are manufactured by Kungalvs Plastbelaggningar AB in Sweden and is distributed by the above-identified AB Sag- & Betongborrning.

Although modifications and changes may be suggested by those skilled in the art it is the intention of the inventor to embody within the patent warranted hereon all changes and modifications as reasonably and properly come within the scope of his contribution to the art.

I claim as my invention:

1. A method for installing at least one wire in a floor in a selected pattern comprising the steps of:
    cutting a slot in the floor corresponding to said selected pattern;
    inserting the wire in said slot;
    inserting a mechanical seal in said slot above said wire initially so as to be flush with the surface of said floor;
    further inserting said mechanical seal in said slot to a predetermined depth which is uniform for the entire length of said slot;
    filling a remainder of said slot above said mechanical seal with thermoplastic material;
    smoothing said thermoplastic material flush with said surface of said floor after curing of said thermoplastic material,
whereby said wire is retained in said slot permitting substantially unimpaired flexing thereof and with substantially no transmission of forces acting on said floor to said wire.

2. A method for installing as claimed in claim 1 wherein said mechanical seal is a continuous strand of elastic material and wherein said step of further inserting said mechanical seal to a predetermined depth in said slot is further defined by:
    further inserting said mechanical seal in said slot to a predetermined depth by moving a tool having a member extending into said slot to said predetermined depth along the surface of said floor such that said member is in substantially continuous contact with said mechanical seal for forcing said mechanical seal into said slot to said predetermined depth.

3. A method for installing as claimed in claim 2 wherein said member is carried on a rotatable wheel and wherein the step of further inserting said mechanical seal in said slot to a predetermined depth is further defined by:
    running said wheel along said surface of said floor over said slot such that said member extends into said slot and substantially continuous contact with said mechanical seal.

4. A method for installing as claimed in claim 1 wherein the number of said wires is greater than one and wherein the step of inserting said wiring said slot is further defined by:
    inserting the wires in said slot one above the other.

5. A method for installing as claimed in claim 1 comprising the additional step of applying a sealer over said floor including said slot filled by said thermoplastic material.

6. A method for installing at least one signal wire in a selected pattern in a floor for an automatic guided vehicle system guide path comprising the steps of:
    cutting a plurality of slots in said floor corresponding to said selected pattern;
    placing said signal wire in said slot;
    inserting a mechanical seal in said slot such that said mechanical seal is initially substantially flush with a surface of said floor;
    forcing said mechanical seal further into said slot to a predetermined depth which is uniform for all of said automatic guided vehicle system guide path;
    filling a remainder of said slot above said mechanical seal with thermoplastic material; and
    smoothing said thermoplastic material substantially flush with said surface of said floor after said thermoplastic material has cured.

7. A method for installing at least one signal wire as claimed in claim 6 wherein said mechanical seal is a substantially continuous strand of elastic material, and wherein the step of forcing said mechanical seal into said slot to a predetermined depth is further defined by moving an element having a member extending into said slot to said predetermined depth over said slot such that said member is in substantially continuous contact with said mechanical seal for pushing said mechanical seal into said slot to said predetermined depth.

8. A method for installing a signal wire as claimed in claim 7 wherein said element is a rotatable wheel and wherein the step of moving said element over said slot is further defined by rotating said wheel over said slot on said surface of said floor.

* * * * *